March 17, 1942.   A. P. G. STEFFES   2,276,747
SELECTOR
Filed Nov. 12, 1938
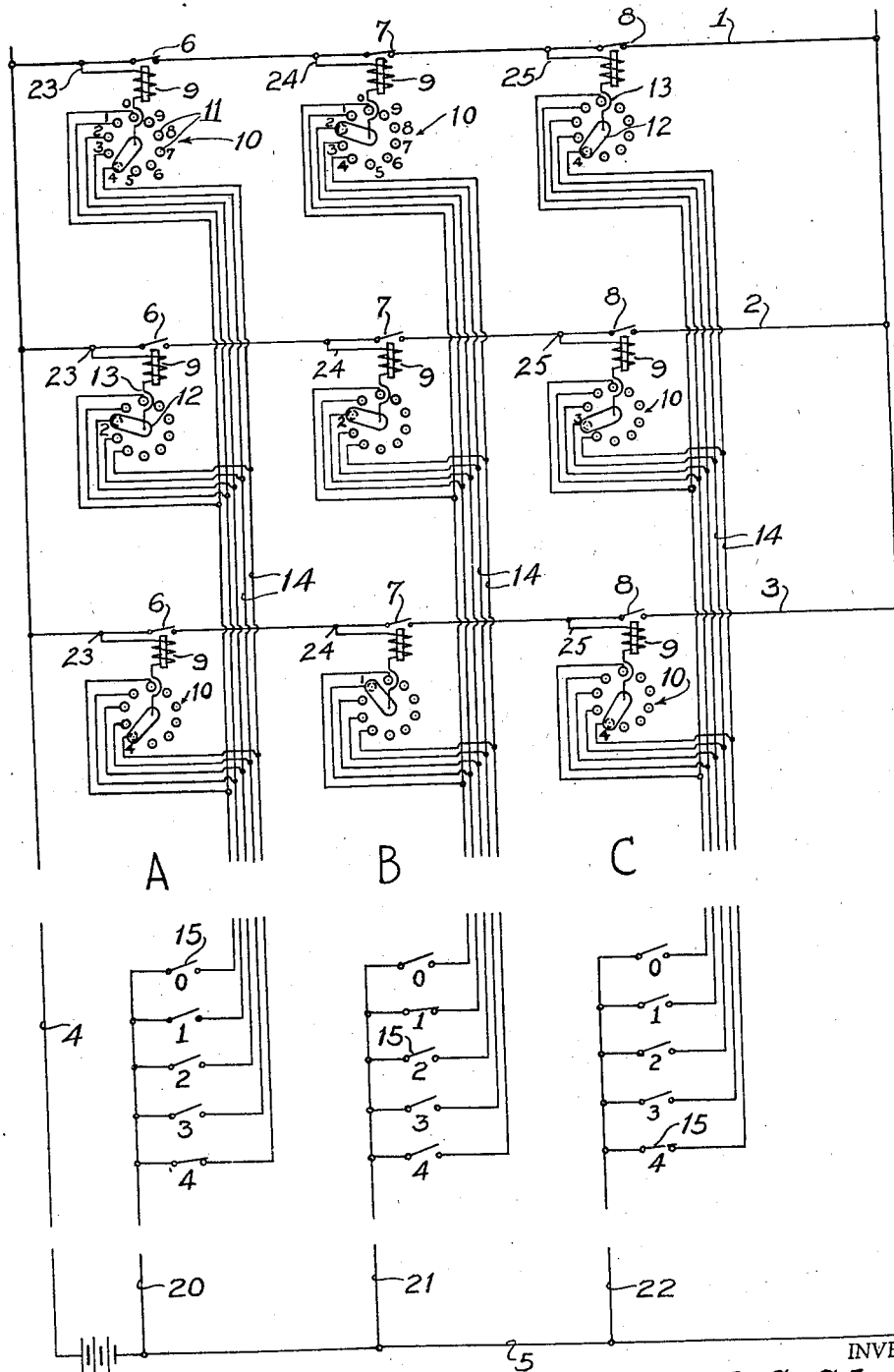
INVENTOR.
Adam P. G. Steffes
BY R. W. Smith
ATTORNEY.

Patented Mar. 17, 1942

2,276,747

UNITED STATES PATENT OFFICE 2,276,747

SELECTOR

Adam P. G. Steffes, Los Angeles, Calif.

Application November 12, 1938, Serial No. 240,192

6 Claims. (Cl. 177—311)

This invention is a selector, actuated by permutations of operating elements.

It is an object of the invention to actuate a selector by electro-magnetic means, and to minimize electrical energy consumed in said operation.

More particularly it is an object of the invention to actuate a selector by permutations of electro-magnetic means arranged so that each successive electro-magnetic element of the group comprising each permutation, is energized only in the event the preceding electro-magnetic elements of that group have been energized.

It is another object of the invention to provide a selector which will indicate to an operator whether a permutation which he may select, has significance in accordance with predetermined setting of the apparatus. For example, the apparatus may be set to actuate indicating means by permutations corresponding to license numbers of motor vehicles wanted by the police, so that when a permutation corresponding to the license number of an observed vehicle has been selected by the operator, failure of that selected permutation to cause actuation of the indicating means will denote that the observed license number is not that of a wanted vehicle, while actuation of the indicating means responsive to the selected permutation will denote that the observed license number is that of a wanted vehicle.

It is another object of the invention to provide a selector which may be altered at will so that any desired permutation will actuate the selector.

More particularly it is an object of the invention to actuate a selector by permutations of electro-magnetic means, and to readily change that permutation of selector circuits which will energize the electro-magnetic means, so that the device may be set to function responsive to any desired permutation of selector circuits.

Further objects of the invention will be readily understood from the following description of the accompanying diagrammatic drawing.

Certain features of the invention, such as the arrangement whereby those permutations which will actuate indicating means may be unknown to the operator until he has selected one of the permutations for which the device has been set, are applicable to a selector which is actuated electrically, mechanically, etc., while certain features of the invention, such as the arrangement for minimizing electrical energy and for varying at will those permutations which will actuate the selector, are particularly applicable to an electrically operated device.

Therefore, an embodiment of the invention has been described and illustrated wherein the various objects of the invention are attained in an apparatus which is electrically controlled for selecting any one of a plurality of electrical circuits, with indicating means actuated by any one of these electrical circuits which is energized responsive to predetermined permutations of electro-magnetic means.

The illustrated embodiment of the invention is thus particularly applicable for indicating whether the license number of an observed motor vehicle is that of a wanted car, or for analogous use for determining whether a particular permutation, as selected by the operator, has significance in accordance with predetermined setting of the apparatus.

In the illustrated embodiment of the invention, electrical circuits which are to be controlled are shown at 1, 2 and 3; and are parallel between leads 4 and 5 which are connected to a suitable source of electrical energy. While only three of these controlled circuits are shown, any number may be employed; and when the apparatus is to be used for spotting wanted vehicles the number of controlled circuits will correspond to the maximum number of wanted cars listed at any one time.

In each of the controlled circuits a plurality of electrical contactors are arranged in series as shown at 6, 7 and 8. While only three contactors are shown in each controlled circuit, the number actually employed will correspond to the number of elements in the permutations which selectively control the circuits. When the apparatus is to be used for spotting wanted vehicles, license numbers of which may include six or seven digits together with one or more letters of the alphabet, the number of contactors in each controlled circuit will correspond to the maximum number of indicia, e. g. digits and/or letters, in motor vehicle license numbers.

Each contactor in each controlled circuit is actuated by a solenoid 9, so that when the series of solenoids for the series of contactors in any controlled circuit have been energized, they close that series of contactors which in turn close the corresponding controlled circuit.

The solenoids 9 are controlled by selector circuits, and a predetermined selector circuit is adapted to energize each solenoid. For this purpose, a switch 10 cooperates with each solenoid, and comprises a plurality of circumferentially spaced contacts 11 and a cooperating contact arm 12 which is rotatably adjustable to engage any one of the contacts. The contact arm of the switch is electrically connected to the solenoid with which the switch cooperates, this connection being shown at 13; and the circumferentially spaced contacts of the switch are respectively connected to a plurality of selector circuits 14.

The solenoids which actuate the contactors 6 of the controlled circuits are energized by one group of selector circuits, and the contactors 6 together with their solenoids and group of selector circuits form one bank of the apparatus which in the drawing is designated bank A. In similar manner, the solenoids which actuate the contactors 7 and the contactors 8 are each energized by a separate group of selector circuits, the contactors 7 and their associated parts forming a bank which in the drawing is designated bank B, and the contactors 8 and their associated parts forming a bank which is designated bank C.

A key 15 is provided in each selector circuit 14, and the keys for the banks A, B and C are separately grouped, preferably in juxtapositioned columns, permitting selection of a permutation of keys, one from each of the banks A, B and C. The keys are preferably mounted on a panel (not shown) which may be remote from a housing (not shown) which contains the controlled circuits and their associated parts. The panel and the housing are connected by the leads 4—5 and by the selector circuits 14, the spaced relation between the panel and housing being indicated in the drawing by the break in the wiring.

The keys 15 bear indicia which may be letters, digits, etc., permutations of which, one from each of the banks A, B and C, indicate the respective controlled circuits. The indicia are shown as digits, and each of the banks A, B and C may include ten keys and associated selector circuits for the digits 0—1—2—9, although the drawing shows only the keys and selector circuits for the digits 0—1—2—3—4.

In lieu of digits, letters may be employed for the keys of one or more banks, with the number of keys and selector circuits in each bank corresponding to the number of letters to be employed in that bank.

Each of the switches 10 has a contact 11 for each of the indicia for which there is a key and selector circuit in the corresponding bank; and each selector circuit of a bank is connected to one of the contacts of each of the switches of that bank. The contacts of each switch have indicia corresponding to the indicia of the keys of the selector circuits to which the respective contacts are connected. In the illustrated embodiment of the invention, there are ten contacts for each switch, respectively bearing indicia which are digits 0—1—2—9, but since the drawing shows only the keys and selector circuits for the digits 0—1—2—3—4, only the contacts bearing similar indicia are shown connected to selector circuits.

To set the apparatus preparatory to use, the contact arm 12 of each switch is rotatably adjusted so as to engage a contact 11 having a desired distinguishing mark. The group of solenoids for the series of contactors in each controlled circuit is thus connected to a selected permutation of selector circuits, one from each of the banks A, B and C, with the selected permutation identified by the indicia of the keys 15 which control that permutation of selector circuits.

The selector circuits 14 are arranged so that each succeeding solenoid for the series of contactors of a controlled circuit is energized upon depressing the corresponding key 15, only in the event all preceding solenoids for that series of contactors have already been energized.

For this purpose, the selector circuits are connected at one end to the lead 5, the connections for the respective banks A, B and C being shown at 20, 21 and 22. Through adjustment of switches 10 the opposite ends of predetermined selector circuits will have been connected to the respective solenoids 9, and the solenoids are in turn connected to the corresponding controlled circuits. The connections for the solenoids of the bank A are shown at 23, with each of these connections between the lead 4 and the series of contactors 6, 7 and 8 in the corresponding controlled circuit. The connections for the solenoids of the bank B are shown at 24, with each of these connections between the contactors 6 and 7 of the corresponding controlled circuit. The connections for the solenoids of the bank C are shown at 25, with each of these connections between the contactors 7 and 8 of the corresponding controlled circuit.

By this arrangement, when a key of the bank A is depressed, all of the solenoids of that bank are energized which through predetermined setting of their switches 10 have been connected to the corresponding selector circuit. The closed circuit is via lead 5, connection 20, the selector circuit which has had its key closed, the solenoids connected to that selector circuit, connections 23 for these solenoids, and the non-interrupted portion of each of the controlled circuits which is between connection 23 and lead 4. The solenoids which are thus energized close the contactors 6 of the corresponding controlled circuits.

When a key of the bank B is depressed, those solenoids which through predetermined setting of their switches 10 have been connected to the corresponding selector circuit are prepared for energization, but only those solenoids are energized which cooperate with controlled circuits the contactors 6 of which have already been closed. The electrical circuit is via lead 5, connection 21, the selector circuit which has had its key closed, the solenoids connected to that selector circuit, connections 24 for these solenoids, and the portion of each of the corresponding controlled circuits which is between connection 24 and lead 4.

This portion of each of the controlled circuits includes contactor 6 which is open unless the proper key of the bank A has been depressed for closing this contactor. Therefore, there is a closed circuit for energizing each of the solenoids in the traced circuit which cooperates with a controlled circuit the contactor 6 of which has already been closed; but the circuit remains open for each of these solenoids which cooperates with a controlled circuit the contactor 6 of which has not been closed. The solenoids which are thus energized close the contactors 7 of the corresponding controlled circuits; while the contactors 7 which cooperate with solenoids which have not been energized remain open. The controlled circuits which have had their contactors 7 closed, are thus closed at both their contactors 6 and 7; and the controlled circuits which have not had their contactors 7 closed, remain open.

In similar manner, when a key of the bank C is depressed, those solenoids which through predetermined setting of their switches 10 have been connected to the corresponding selector circuit are prepared for energization, but only those solenoids are energized which cooperate with controlled circuits the contactors 6 and 7 of which have already been closed. The electrical circuit is via lead 5, connection 22, the selector circuit which has had its key closed, the solenoids connected to that selector circuit, connections 25 for these solenoids, and the portion of each of the corresponding controlled circuits which is between connection 25 and lead 4.

This portion of each of the controlled circuits includes contactors 6 and 7 which are open unless the proper keys, one from each of banks A and B, have been depressed for closing these contactors. Therefore, there is a closed circuit for energizing each of the solenoids in the traced circuit which cooperates with a controlled circuit the contactors 6 and 7 of which have already been closed; but the circuit remains open for each of these solenoids which cooperates with a controlled circuit the contactors 6 and 7 of which have not been closed. The solenoids which are thus energized close the contactors 8 of the corresponding controlled circuits; while the contactors 8 which are controlled by solenoids which have not been energized remain open. The controlled circuits which have had their contactors 8 closed, are thus closed at their contactors 6, 7 and 8; and the controlled circuits which have not had their contactors 8 closed, remain open.

When the series of contactors in a controlled circuit have thus been closed by depressing the proper permutation of keys, one from each of the banks A, B and C, that controlled circuit is closed, the circuit being via lead 5, the closed series of contactors in the controlled circuit, and lead 4. As an illustration, with the switches 10 adjusted as shown in the drawing depressing those permutations of keys which bear the indicia 4—2—4, 2—2—3 and 4—1—4, respectively close the circuits 1, 2 and 3; while depressing any other permutation of keys will not close the series of contactors in a controlled circuit and consequently will not close a controlled circuit.

In the drawing, that permutation of keys which bears the indicia 4—2—4 has been depressed. This closes the series of contactors in the circuit 1 and thus closes this controlled circuit. It also closes the contactor 6 of the circuit 3 since this contactor is controlled by the key corresponding to the first element of the selected permutation, but the contactor 7 of the circuit 3 is not closed since it is controlled by a key different from the second element of the selected permutation, nor is the contactor 7 of the circuit 2 closed, since although it is controlled by the key corresponding to the second element of the selected permutation, its solenoid is not energized, due to the contactor 6 of the circuit 2 being open as a result of being controlled by a key different from the first element of the selected permutation.

In similar manner, the contactor 8 of the circuit 2 is not closed since it is controlled by a key different from the third element of the selected permutation, nor is the contactor 8 of the circuit 3 closed, since although it is controlled by the key corresponding to the third element of the selected permutation, its solenoid is not energized, due to the contactor 7 of the circuit 3 being open as a result of being controlled by a key different from the second element of the selected permutation.

Consequently, depressing any permutation of keys will close only that controlled circuit which has had its switches 10 adjusted to correspond to that particular permutation; and the solenoids for a controlled circuit which have had their switches adjusted to correspond to succeeding elements of the selected permutation, will only be energized if all preceding solenoids for that controlled circuit have had their switches adjusted to correspond to the preceding elements of the selected permutation.

The controlled circuits which are thus selectively closed may each include any desired electrical element which is to be energized by the closed circuit. For example, any desired electrical element (not shown) may be interposed in each of the controlled circuits 1, 2 and 3, between the lead 5 and the series of contactors 6, 7 and 8 in each controlled circuit. But in the illustrated embodiment of the invention, closing any one of the controlled circuits energizes a common indicating means. For this purpose, an electrically actuated indicating means such as an electric bell 30 is interposed in the lead 5, between the source of electrical energy and the connections for the circuits 1, 2 and 3.

The illustrated embodiment of the invention is thus particularly applicable for purposes such as indicating whether any permutation of keys which may be depressed has significance in accordance with previous setting of the apparatus.

Such embodiment of the invention is applicable for spotting wanted motor vehicles. The housing for the controlled circuits and their associated parts may be stored in the luggage compartment of a patrol car, after first setting the switches 10 so that each controlled circuit will be closed by depressing a permutation of keys bearing indicia corresponding to the license number of a wanted vehicle. The indicator 30 and the panel for the keys may be located in the patrol car convenient to the operator.

The license number of any passing vehicle may thus be checked by depressing that permutation of keys bearing indicia corresponding to the license number of the observed vehicle. If, responsive to this selected permutation the indicating means 30 is actuated it denotes that the observed license number is that of a wanted vehicle, while failure of the indicating means 30 to respond to the selected permutation indicates that the observed license number is not that of a wanted vehicle.

I claim:

1. In a selector, an electrical circuit, contactors in series in the circuit, an actuator for each contactor, an operating connection for each actuator, and a control for each operating connection, the controls being operable independently of one another for selective operation of one or more controls, the operating connection for the actuator for a first contactor of the series having its associated actuator connected thereto independently of the other contactors of the series, and the operating connection for the actuator for each succeeding contactor of the series having its associated actuator and the preceding contactors of the series connected in series in said operating connection for functioning of said operating connection dependently upon actuation of said preceding contactors.

2. In a selector, an electrical circuit, contactors in series in the circuit, a solenoid for actuating each contactor, a selector circuit for each solenoid, and a switch in each selector circuit, the switches being operable independently of one another for selective operation of one or more switches, the selector circuit for the solenoid for a first contactor of the series being independent of the other contactors of the series, and the selector circuit for the solenoid for each succeeding contactor of the series having its associated solenoid and the preceding contactors in series in said selector circuit for functioning of said selector circuit dependently upon actuation of said preceding contactors.

3. In a selector, an electrical circuit, contactors in series in the circuit, a solenoid for actuating each contactor, a group of selector circuits associated with each solenoid, means for selectively connecting a predetermined selector circuit of each group to the solenoid associated with that group, and a switch in each selector circuit, the switches being operable independently of one another for selective operation of one of the switches of one or more of the groups of selector circuits, the selector circuit which is connected to the solenoid for a first contactor of the series being independent of the other contactors of the series, and the selector circuit which is connected to the solenoid of each succeeding contactor of the series having its associated solenoid and the preceding contactors in series in said selector circuit for functioning of said selector circuit dependently upon actuation of said preceding contactors.

4. In a selector, a plurality of electrical circuits, contactors in series in each circuit, a solenoid for actuating each contactor, groups of selector circuits, one group of the seletor circuits being associated with that group of solenoids which are associated with first contactors of the electrical circuits, succeeding groups of the selector circuits being respectively associated with the groups of solenoids which are associated with respectively succeeding contactors of the electrical circuits, one or more of the solenoids of each group being connected to a predetermined selector circuit of that group, and a switch in each selector circuit, the switches being operable independently of one another for selective operation of one of the switches of one or more of the groups of selector circuits, each selector circuit which is connected to one or more solenoids for the first group of contactors of the series being independent of the other contactors of the series, and each selector circuit which is connected to one or more solenoids for a succeeding group of contactors of the series having its one or more associated solenoids and the preceding contactors of the one or more associated electrical circuits in series in said selector circuit for functioning of said selector circuit dependently upon actuation of said preceding contactors.

5. In a selector, a plurality of electrical circuits, contactors in series in each circuit, a solenoid for actuating each contactor, groups of selector circuits, one group of the selector circuits being associated with that group of solenoids which are associated with first contactors of the electrical circuits, succeeding groups of the selector circuits being respectively associated with the groups of solenoids which are associated with respectively succeeding contactors of the electrical circuits, means for selectively connecting a predetermined selector circuit of each group to a predetermined one or more of the solenoids of that group, and a switch in each selector circuit, the switches being operable independently of one another for selective operation of one of the switches of one or more of the groups of selector circuits, each selector circuit which is connected to one or more solenoids for the first group of contactors of the series being independent of the other contactors of the series, and each selector circuit which is connected to one or more solenoids for a succeeding group of contactors of the series having its one or more associated solenoids and the preceding contactors of the one or more associated electrical circuits in series in said selector circuit for functioning of said selector circuit dependently uopn actuation of said preceding contactors.

6. In a selector, a plurality of electrical circuits, an indicator controlled by any one of said circuits, contactors in series in each circuit, a solenoid for actuating each contactor, groups of selector circuits, one group of the selector circuits being associated with that group of solenoids which are associated with first contactors of the electrical circuits, succeeding groups of the selector circuits being respectively associated with the groups of solenoids which are associated with respectively succeeding contactors of the electrical circuits, one or more of the solenoids of each group being connected to a predetermined selector circuit of that group, and a switch in each selector circuit, the switches being operable independently of one another for selective operation of one of the switches of one or more of the groups of selector circuits, each selector circuit which is connected to one or more solenoids for the first group of contactors of the series being independent of the other contactors of the series, and each selector circuit which is connected to one or more solenoids for a succeeding group of contactors of the series having its one or more associated solenoids and the preceding contactors of the one or more associated electrical circuits in series in said selector circuit for functioning of said selector circuit dependently upon actuation of said preceding contactors.

ADAM P. G. STEFFES.